(12) United States Patent
Lin et al.

(10) Patent No.: US 11,705,984 B2
(45) Date of Patent: Jul. 18, 2023

(54) METHOD FOR DETERMINING DEMODULATION REFERENCE SIGNAL FOR MULTIPLE ACCESS TRANSMISSION

(71) Applicant: Telefonaktiebolaget LM Ericsson (publ), Stockholm (SE)

(72) Inventors: Zhipeng Lin, Nanjing Jiangsu (CN); Ali Behravan, Stockholm (SE); Andres Reial, Malmö (SE); Robert Mark Harrison, Grapevine, TX (US); Robert Baldemair, Solna (SE); Krishna Chitti, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/265,316

(22) PCT Filed: Apr. 16, 2019

(86) PCT No.: PCT/CN2019/082893
§ 371 (c)(1),
(2) Date: Feb. 2, 2021

(87) PCT Pub. No.: WO2020/029603
PCT Pub. Date: Feb. 13, 2020

(65) Prior Publication Data
US 2021/0306191 A1    Sep. 30, 2021

(30) Foreign Application Priority Data

Aug. 6, 2018  (WO) ................ PCT/CN2018/098989

(51) Int. Cl.
*H04L 1/00* (2006.01)
*H04J 13/00* (2011.01)
(Continued)

(52) U.S. Cl.
CPC ........ *H04L 1/0041* (2013.01); *H04J 13/0029* (2013.01); *H04L 1/0061* (2013.01);
(Continued)

(58) Field of Classification Search
None
See application file for complete search history.

(56) References Cited

U.S. PATENT DOCUMENTS

2019/0132870 A1\* 5/2019 Guey .................... H04W 16/14
2019/0245640 A1\* 8/2019 Yoshimoto ............ H04W 74/08
(Continued)

FOREIGN PATENT DOCUMENTS

WO     2017204549 A1   11/2017
WO     2018056775 A1   3/2018

OTHER PUBLICATIONS

3GPP, "3GPP TS 38.212 V15.2.0", 3rd Generation Partnership Project; Technical Specification Group Radio Access Network; NR; Multiplexing and channel coding (Release 15), Jun. 2018, 1-98.
(Continued)

*Primary Examiner* — Otis L Thompson, Jr.
(74) *Attorney, Agent, or Firm* — Murphy, Bilak & Homiller, PLLC

(57) ABSTRACT

The present disclosure relates to a method for a terminal device to determine demodulation reference signal (DMRS), comprising: obtaining (211) a DMRS configuration and a corresponding signature assigned by a network side node; constructing (212) a DMRS according to the DMRS configuration; mapping (213) the DMRS to a physical channel assigned to the terminal device. The signature indicates a processing configuration for the physical channel. In the embodiments of the present disclosure, the signature, and DMRS configuration may be configured correspondingly, to obtain low-crosstalk DMRS signals for different terminal
(Continued)

devices, thus, the number of the supported terminal devices may be improved.

19 Claims, 14 Drawing Sheets

(51) Int. Cl.
  *H04L 5/00* (2006.01)
  *H04L 25/03* (2006.01)
  *H04L 27/26* (2006.01)
(52) U.S. Cl.
  CPC .......... *H04L 1/0071* (2013.01); *H04L 5/0048* (2013.01); *H04L 5/0051* (2013.01); *H04L 25/03866* (2013.01); *H04L 27/2613* (2013.01)

(56) References Cited

U.S. PATENT DOCUMENTS

| | | | |
|---|---|---|---|
| 2020/0146108 A1* | 5/2020 | Goto | H04W 76/27 |
| 2020/0154481 A1* | 5/2020 | Goto | H04W 72/1284 |
| 2021/0068115 A1* | 3/2021 | Gotoh | H04W 72/0493 |
| 2021/0136827 A1* | 5/2021 | Xiong | H04L 5/0044 |
| 2021/0144715 A1* | 5/2021 | Gotoh | H04W 72/0493 |
| 2021/0152409 A1* | 5/2021 | Pan | H04W 74/0833 |
| 2021/0203465 A1* | 7/2021 | Meng | H04B 7/2043 |
| 2021/0243777 A1* | 8/2021 | Tsai | H04W 72/14 |
| 2021/0243784 A1* | 8/2021 | Goto | H04L 1/0016 |

OTHER PUBLICATIONS

3GPP, "3rd Generation Partnership Project; Technical Specification Group Radio Access Network; NR; Physical channels and modulation (Release 15) 3GPP TS 38.211 V15.2.0", 3GPP TS 38.211 V15.2.0, Jun. 2018, 1-96.

3GPP, "3rd Generation Partnership Project; Technical Specification Group Radio Access Network; NR; Physical layer procedures for data (Release 15)", 3GPP TS 38.214 V15.2.0, Jun. 2018, 1-94.

Huawei, et al., "Discussion on LLS parameters and methodology for NoMA evaluation", 3GPP TSG RAN WG1 NR Adhoc Meeting, R1-1800024, Vancouver, Canada, Jan. 22-26, 2018, 1-6.

Qualcomm Incorporated, "Procedures Related to NOMA", 3GPP TSG RAN WG1 Meeting #93, R1-1807379, Busan, South Korea, May 21-May 25, 2018, 1-6.

Spreadtrum Communications, "Considerations on NOMA procedures", 3GPP TSG RAN WG1 Meeting #93, R1-1806405, Busan, Korea, May 21-May 25, 2018, 1-3.

ZTE, "Offline summary for AI 7.4.3 Procedures related to NOMA", 3GPP TSG RAN WG1 Meeting #93, R1-1807780, Busan, Korea, May 21-25, 2018, 1-3.

Unknown, Author, "Considerations on pre-configured resource for grant-free based UL non-orthogonal MA", 3GPP TSG RAN WGI meeting #86bis, RI-1608919, Lisbon, Portugal, Oct. 10-14, 2016, 1-3.

Unknown, Author, "Discussion on NOMA Procedures", 3GPP TSG RAN WG1 Meeting #92bis, R1-1803852, Sanya, China, Feb. 16-Mar. 20, 2018, 1-4.

Unknown, Author, "Discussion on NoMA related procedures", 3GPP TSG RAN WGI Meeting #93, RI-1805909, Busan, Korea, May 21-25, 2018, 1-4.

\* cited by examiner

First symbol

| | Subcarrier | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Port 0: | $r(0)$ | 0 | $r(1)$ | 0 | $r(2)$ | 0 | $r(3)$ | 0 | $r(4)$ | 0 | $r(5)$ | 0 |
| Port 1: | $r(0)$ | 0 | $-r(1)$ | 0 | $r(2)$ | 0 | $-r(3)$ | 0 | $r(4)$ | 0 | $-r(5)$ | 0 |
| Port 2: | 0 | $r(0)$ | 0 | $r(1)$ | 0 | $r(2)$ | 0 | $r(3)$ | 0 | $r(4)$ | 0 | $r(5)$ |
| Port 3: | 0 | $r(0)$ | 0 | $-r(1)$ | 0 | $r(2)$ | 0 | $-r(3)$ | 0 | $r(4)$ | 0 | $-r(5)$ |
| Port 4: | $r(0)$ | 0 | $r(1)$ | 0 | $r(2)$ | 0 | $r(3)$ | 0 | $r(4)$ | 0 | $r(5)$ | 0 |
| Port 5: | $r(0)$ | 0 | $-r(1)$ | 0 | $r(2)$ | 0 | $-r(3)$ | 0 | $r(4)$ | 0 | $-r(5)$ | 0 |
| Port 6: | 0 | $r(0)$ | 0 | $r(1)$ | 0 | $r(2)$ | 0 | $r(3)$ | 0 | $r(4)$ | 0 | $r(5)$ |
| Port 7: | 0 | $r(0)$ | 0 | $-r(1)$ | 0 | $r(2)$ | 0 | $-r(3)$ | 0 | $r(4)$ | 0 | $-r(5)$ |

Second symbol

| | Subcarrier | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Port 0: | $r(0)$ | 0 | $r(1)$ | 0 | $r(2)$ | 0 | $r(3)$ | 0 | $r(4)$ | 0 | $r(5)$ | 0 |
| Port 1: | $r(0)$ | 0 | $-r(1)$ | 0 | $r(2)$ | 0 | $-r(3)$ | 0 | $r(4)$ | 0 | $-r(5)$ | 0 |
| Port 2: | 0 | $r(0)$ | 0 | $r(1)$ | 0 | $r(2)$ | 0 | $r(3)$ | 0 | $r(4)$ | 0 | $r(5)$ |
| Port 3: | 0 | $r(0)$ | 0 | $-r(1)$ | 0 | $r(2)$ | 0 | $-r(3)$ | 0 | $r(4)$ | 0 | $-r(5)$ |
| Port 4: | $-r(0)$ | 0 | $-r(1)$ | 0 | $-r(2)$ | 0 | $-r(3)$ | 0 | $-r(4)$ | 0 | $-r(5)$ | 0 |
| Port 5: | $-r(0)$ | 0 | $r(1)$ | 0 | $-r(2)$ | 0 | $r(3)$ | 0 | $-r(4)$ | 0 | $r(5)$ | 0 |
| Port 6: | 0 | $-r(0)$ | 0 | $-r(1)$ | 0 | $-r(2)$ | 0 | $-r(3)$ | 0 | $-r(4)$ | 0 | $-r(5)$ |
| Port 7: | 0 | $-r(0)$ | 0 | $r(1)$ | 0 | $-r(2)$ | 0 | $r(3)$ | 0 | $-r(4)$ | 0 | $r(5)$ |

Figure 6

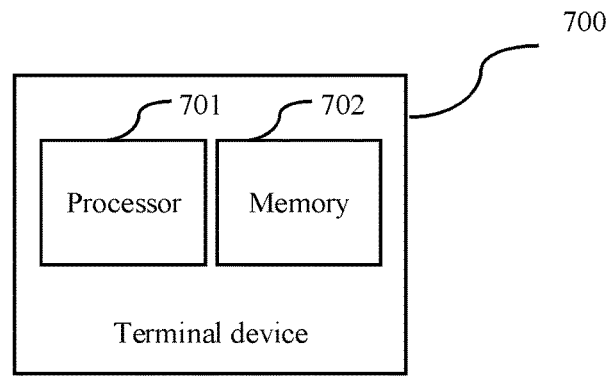

Figure 7

METHOD FOR DETERMINING DEMODULATION REFERENCE SIGNAL FOR MULTIPLE ACCESS TRANSMISSION

TECHNICAL FIELD

The present disclosure relates generally to the technology of wireless communication, and in particular, to a method for determining demodulation reference signal for multiple access transmission.

BACKGROUND

This section introduces aspects that may facilitate better understanding of the disclosure. Accordingly, the statements of this section are to be read in this light and are not to be understood as admissions about what is in the prior art or what is not in the prior art.

FIG. 1 is an exemplary block diagram showing nodes in a typical communication system. As shown in FIG. 1, in a communication network, there may be a demand for node 100 to communicate with a plurality of nodes 201, 202, 203 . . . , simultaneously. For example, one network side node (e.g. scheduling node, such as base station) may be arranged to communicate with a plurality of terminal devices. These terminal devices may be wireless devices, such as user equipments (UEs), or a plurality of layers of a wireless device, which correspond to independent transport blocks (TBs).

In order to demodulate different signals from/to a plurality of nodes, some parameters of corresponding physical channels need to be estimated using reference signals, such as a demodulation reference signal (DMRS), which is described in section 6.4.1, 3rd Generation Partnership Project Technical Specification (3GPP TS) 38.211, version 15.2.0.

In a conventional orthogonal multiple access (OMA) manner, physical channels are transmitted such that a desired physical channel can be received without knowing the structure of an interfering physical channel: since the interference is orthogonal to the desired physical channel, the interference does not degrade the reception of the desired physical channel. However, in non-orthogonal multiple access (NOMA), the presence of an interfering physical channel degrades the reception of a desired physical channel. Some improved mechanism is needed to distinguish these physical channels, otherwise the number of nodes to be served still cannot be improved.

In order to improve the number of nodes to be served in a communication system, an improved method for determining demodulation reference signal (DMRS) is further considered, so as to identify and/or constructing a non-orthogonal multiple access (NOMA) transmission.

SUMMARY

Certain aspects of the present disclosure and their embodiments may provide a solution to at least part of these or other challenges. There are, proposed herein, various embodiments which address one or more of the issues disclosed herein.

A first aspect of the present disclosure provides a method for a terminal device to determine demodulation reference signal (DMRS), including: obtaining a DMRS configuration and a corresponding signature assigned by a network side node; constructing a DMRS according to the DMRS configuration; mapping the DMRS to a physical channel assigned to the terminal device. The signature indicates a processing configuration for the physical channel.

In embodiments of the present disclosure, the physical channel is assigned from a plurality of physical channels located at a set of radio resource elements. The processing configuration is for processing a transport block (TB) of the physical channel.

In embodiments of the present disclosure, processing a transport block (TB) includes: processing information bits of the transport block to produce modulation symbols carried in the physical channel. The modulation symbols vary, in response to that a different signature is applied to the same information bits. Processing information bits of the transport block includes at least one of: generating error correction coded bits of the information bits; interleaving the error correction coded bits; scrambling the error correction coded bits; mapping the error correction coded bits to the physical channel; generating modulation symbols of the information bits; spreading the modulation symbols; scrambling the modulation symbols; and assigning a power level to the physical channel.

In embodiments of the present disclosure, the DMRS configuration includes at least one of: an identifier number n of a DMRS port, an identifier number $ID_{GP}$ of a generation parameter of a DMRS sequence, and a value of the generation parameter of the DMRS sequence.

In embodiments of the present disclosure, an identifier number $ID_S$ of the signature is determined based on at least one of: the identifier number n of the DMRS port, the $ID_{GP}$, and the value of the generation parameter.

In embodiments of the present disclosure, the $ID_S$ is determined by: $ID_S = n*M + ID_{GP}$, wherein n is an integer in a range of [0, N−1], $ID_{GP}$ is an integer in a range of [0, M−1], N is a number of DMRS ports, and M is a number of DMRS sequences.

In embodiments of the present disclosure, the generation parameter includes at least one of: a scramblingID, a cyclic shift, and a root sequence, which are used for generating the DMRS sequence.

In embodiments of the present disclosure, the $ID_S$ is determined by: $ID_S = P1*\text{mod}(ID_{GP}, P2) + n$, wherein P1 is a number of DMRS ports, and P2 is a number of DMRS sequences.

In embodiments of the present disclosure, obtaining a DMRS configuration and a corresponding signature assigned by a network side node includes one of: receiving, from the network side node, a message including at least one of the n, the $ID_{GP}$, and the value of the generation parameter; wherein the $ID_S$ is determined by the terminal device, based on the at least one of the n, the $ID_{GP}$, and the value of the generation parameter of the DMRS sequence; and receiving, from the network side node, a message including the $ID_S$, and at least one of the n, the $ID_{GP}$, and the value of the generation parameter.

In embodiments of the present disclosure, the DMRS configuration is assigned from a plurality of DMRS configurations extended using at least one of: scrambling (S301) a plurality of DMRS sequences with a plurality of scrambling sequences; mapping (S302) more than one DMRS sequences to a DMRS port; increasing (S303) resources assigned to the plurality of DMRS sequences, wherein the resource includes at least one of time resource, frequency resource, and code division multiplexing (CDM) cover code resource; assigning (S304) a DMRS sequence and a DMRS port to a group of physical channels corresponding to terminal devices located in a predetermined physical distance; and using (S305) a non-DMRS reference signal in a network for demodulation as a function of DMRS.

In embodiments of the present disclosure, the plurality of scrambling sequences includes at least one of a pseudorandom sequence, an M-sequence, and a Gold sequence; and/or the plurality of scrambling sequences are distinguished with each other by changing at least one of a root index, a generator polynomial, a cyclic shift value, and a sequence offset value.

In embodiments of the present disclosure, the plurality of scrambling sequences are determined based on the signature.

In embodiments of the present disclosure, a scrambling sequence with $ID_{SQ}$ and a DMRS sequence with $ID_D$ are assigned to a physical channel associated to the signature with $ID_S$; wherein ID refers to an identifier number, $ID_S$ refers to an identifier number of the signature, $ID_{SQ}$ refers to an identifier number of the scrambling sequence, and $ID_D$ refers to an identifier number of DMRS sequence; wherein the $ID_{SQ}$ equals to one of floor ($ID_S/X$) and mod ($ID_S$, X), and the $ID_D$ equals to other one of floor ($ID_S/X$) and mod ($ID_S$, X); and wherein X refers to one of: a number of the plurality of DMRS sequences and a number of the plurality of scrambling sequences.

In embodiments of the present disclosure, a scrambling sequence with the $ID_{SQ}$ of 0 is a sequence containing elements with the same value.

In embodiments of the present disclosure, an information element for a terminal device is configured to indicate whether to support a scrambled DMRS sequence.

In embodiments of the present disclosure, the terminal device includes a non orthogonal multiple access, NOMA, terminal configured to support the scrambled DMRS sequence.

In embodiments of the present disclosure, the plurality of DMRS sequences are orthogonal.

In embodiments of the present disclosure, increasing (S303) resources assigned to the plurality of DMRS sequences includes at least one of: increasing (S401) a number of CDM groups for the plurality of DMRS sequences in a symbol of a physical resource block (PRB); and increasing (S402) at least one of time interval and frequency interval between different DMRS sequences in a PRB.

In embodiments of the present disclosure, the non-DMRS reference signal is a secondary synchronization signal (SSS).

In embodiments of the present disclosure, the terminal device includes at least one of: user equipment (UE), and a layer of a UE.

In embodiments of the present disclosure, the network side node includes a base station node.

A second aspect of the present disclosure provides a method for a network side node to configure demodulation reference signal (DMRS), including: determining a DMRS configuration from a plurality of DMRS configurations; and assigning the DMRS configuration and a corresponding signature to a terminal device, so as to serve a physical channel assigned to the terminal device. The signature indicates a processing configuration for the physical channel.

In embodiments of the present disclosure, assigning the DMRS configuration and a corresponding signature to a terminal device includes one of: sending, to the terminal device, a message including at least one of the n, the $ID_{GP}$, and the value of the generation parameter, wherein the $ID_S$ is determined by the terminal device, based on the at least one of the n, the $ID_{GP}$, and the value of the generation parameter of the DMRS sequence; and sending, to the terminal device, a message including the $ID_S$, and at least one of the n, the $ID_P$, and the value of the generation parameter.

A third aspect of the present disclosure provides a terminal device, including: a processor; and a memory, containing instructions executable by the processor. The terminal device is operative to the method described in the first aspect.

A fourth aspect of the present disclosure provides a network side node device, including: a processor; and a memory, containing instructions executable by the processor. The network side node device is operative to the method described in the second aspect.

A fifth aspect of the present disclosure provides a virtual apparatus for a terminal device, including: obtainment unit, configure to obtain a DMRS configuration and a corresponding signature assigned by a network side node; construction unit, configured to constructing a DMRS according to the DMRS configuration and mapping unit, configured to map the DMRS to a physical channel assigned to the terminal device. The signature indicates a processing configuration for the physical channel.

A sixth aspect of the present disclosure provides a virtual apparatus for a network side node device, including: determination unit, configured to determine a DMRS configuration from a plurality of DMRS configurations; and assignment unit, configured to assign the DMRS configuration and a corresponding signature to a terminal device, so as to serve a physical channel assigned to the terminal device. The signature indicates a processing configuration for the physical channel.

A seventh aspect of the present disclosure provides a computer readable storage medium having a computer program stored thereon, the computer program executable by a device to cause the device to carry out the method described above.

An eighth aspect of the present disclosure provides a communication system including a host computer including: processing circuitry configured to provide user data; and a communication interface configured to forward the user data to a cellular network for transmission to a terminal device. The cellular network includes a base station. The base station is the network side node device described in the fourth aspect, and/or the terminal device is the terminal device described in the third aspect.

In embodiments of the present disclosure, the communication system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

A ninth aspect of the present disclosure provides a communication system including a host computer including: a communication interface configured to receive user data originating from a transmission from a terminal device; a base station. The transmission is from the terminal device to the base station. The base station is the network side node device described in the fourth aspect, and/or the terminal device is the terminal device described in the third aspect.

In embodiments of the present disclosure, the processing circuitry of the host computer is configured to execute a host application; the terminal device is configured to execute a client application associated with the host application, thereby providing the user data to be received by the host computer.

In the embodiments of the present disclosure, the signature, and DMRS configuration may be configured correspondingly, to obtain low-crosstalk DMRS signals for different terminal devices, thus, the number of the supported terminal devices may be improved.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 6 is another exemplary mapping of DMRS with code division multiplexing (CDM);

FIG. 7 is a block schematic showing an exemplary terminal device;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In a NOMA systems, it is necessary to estimate the modulation symbols of an interfering physical channel in order to suppress them, and so some mechanism to identify interfering DMRS is needed. Furthermore, unlike OMA systems, NOMA physical channels of different UEs are processed using different configurations, as NOMA signatures, in order to enhance the ability of a receiver to suppress mutual interference among the UEs. This signature may not be identifiable from measurements of the NOMA physical channel. However, embodiments of the present disclosure provide methods and devices to improve distinguishing different physical channels.

Figure 1:
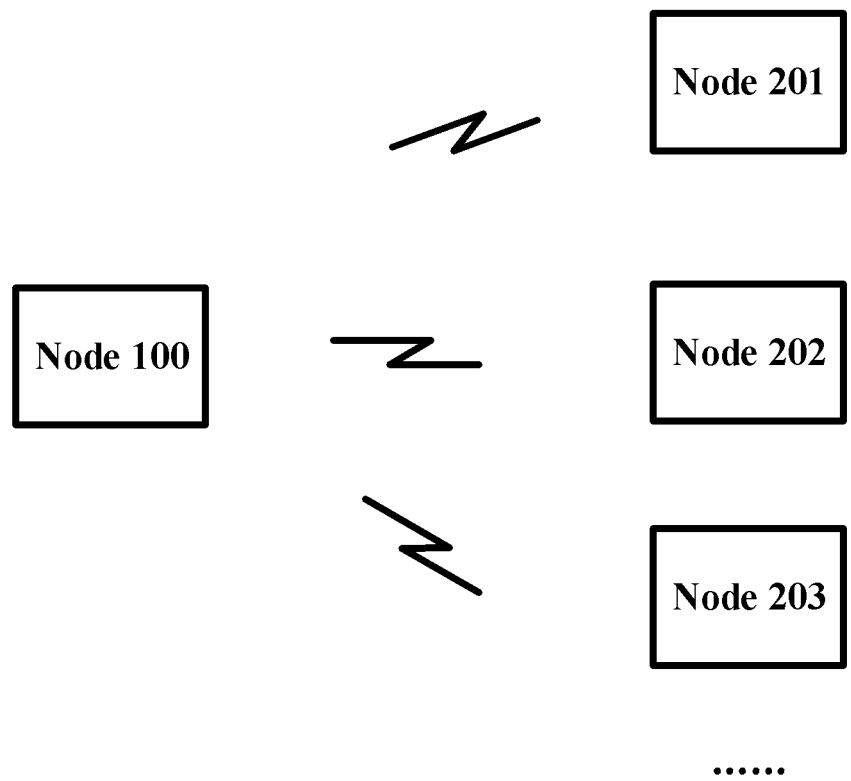
FIG. 1 is an exemplary block diagram showing nodes in a communication system.
Figure 2:
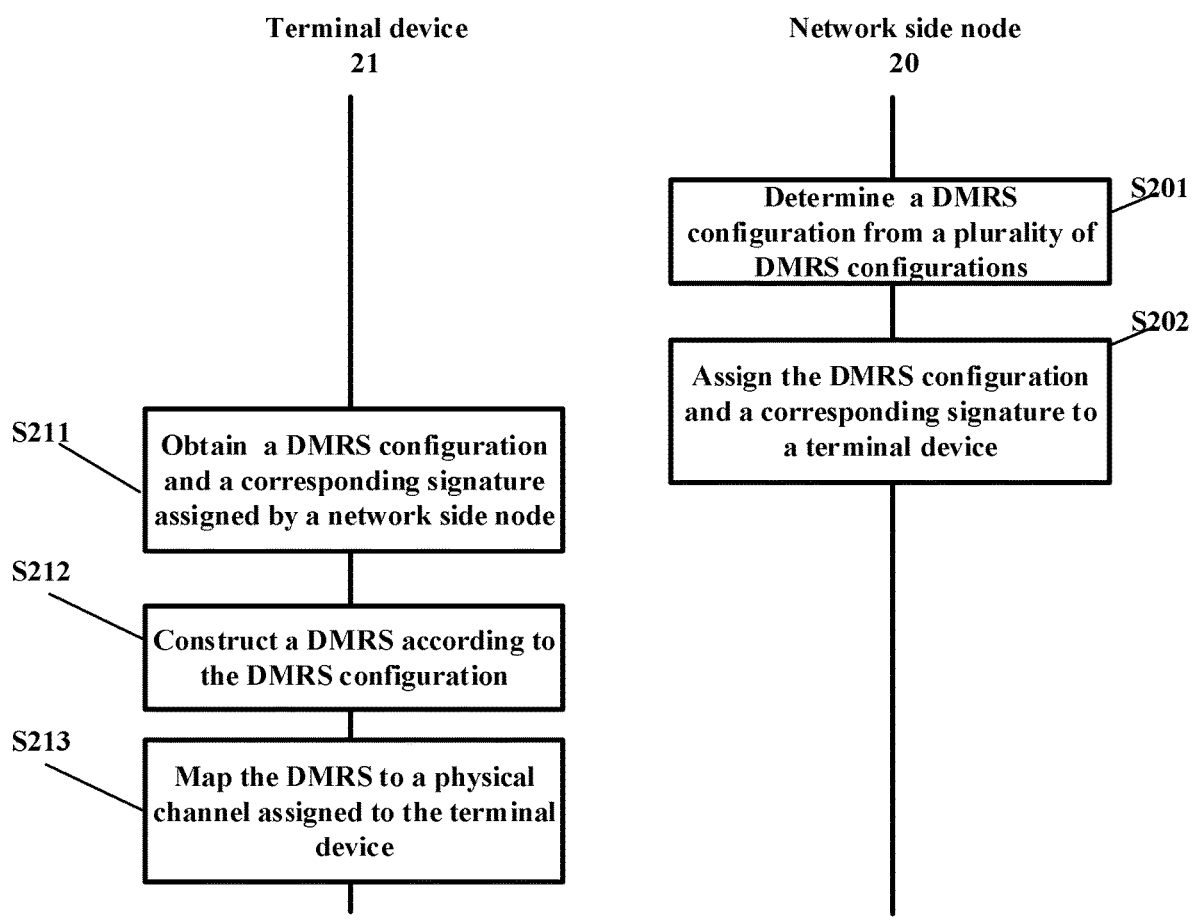
FIG. 2 is an exemplary flow chart showing methods for configuring and determining demodulation reference signal (DMRS)

FIG. 2 is an exemplary flow chart showing methods for configuring and determining demodulation reference signal (DMRS).

The method for a network side node 20 to configure demodulation reference signal (DMRS), including: step S201, determining a DMRS configuration from a plurality of DMRS configurations; and step S202, assigning the DMRS configuration and a corresponding signature to a terminal device, so as to serve a physical channel assigned to the terminal device. The signature indicates a processing configuration for the physical channel. The physical channel may be any physical channel, such as a physical uplink shared channel (PUSCH), a physical downlink shared channel (PDSCH), or a sidelink physical channel, etc. For example, the physical channel may be constructed according to the signature. The DMRS and the physical channel are transmitted by the terminal device.

Accordingly, the method for a terminal device 21 to determine demodulation reference signal (DMRS), includes: step S211, obtaining a DMRS configuration and a corresponding signature assigned by a network side node; step S212, constructing a DMRS according to the DMRS configuration; mapping step S213, the DMRS to a physical channel assigned to the terminal device.

In embodiments of the present disclosure, the terminal device includes at least one of: user equipment (UE), and a layer of a UE. The network side node includes a base station node.

In embodiments of the present disclosure, the signature, and DMRS configuration may be configured correspondingly, to obtain low-crosstalk DMRS signals for different terminal devices, thus, the number of the supported terminal devices may be improved. The method is particularly applicable to a non-orthogonal multiple access (NOMA) communication system with more nodes, when the number of conventional DMRS ports is not enough.

In embodiments of the present disclosure, the physical channel is assigned from a plurality of physical channels located at a set of radio resource elements. The processing configuration is for processing a transport block (TB) of the physical channel.

In a NOMA circumstance, NOMA schemes are generally based on different processing configuration about interleaving, scrambling, spreading, or power allocation methods and mapping a user equipment's (UE's) higher layer information bits on resources that are shared among multiple UEs. In general, the NOMA mapping entails processing the higher layer information bits in the UE to produce modulation symbols of a physical channel in a set of resource elements (REs) according to a signature, such that different signatures produce different modulation symbols in the REs for the same values of information bits. Because the modulation symbols vary differently for different signatures, the physical channels produced with different signatures are distinguishable by a receiver that is aware which signatures are used. Therefore, multiple users can then be scheduled in same resources, according to a NOMA approach, with the inherent realization that the users' signals will not be substantially orthogonal at the receiver. Rather, there will exist residual inter-user interference that needs to be handled by the receiver. By the nature of NOMA transmission, multiple signals are received non-orthogonally and the overlapping signals will generally be separated by the receiver prior to decoding. To assist in that handling, the signature indicating processing configuration may be jointly determined with the DMRS configuration, so as to obtain low-crosstalk DMRS signals for different terminal devices, thus, the number of the supported terminal devices may be improved.

In embodiments of the present disclosure, processing a transport block (TB) includes: processing information bits of the transport block to produce modulation symbols carried in the physical channel. The modulation symbols vary, in response to that a different signature is applied to the same information bits. Namely, even for the same information bits, different signature will lead to different symbols in the physical channel, thus, influence between different physical channels may be reduced obviously.

Processing information bits of the transport block includes at least one of: generating error correction coded bits of the information bits; interleaving the error correction coded bits; scrambling the error correction coded bits; mapping the error correction coded bits to the physical channel; generating modulation symbols of the information bits; spreading the modulation symbols; scrambling the modulation symbols; and assigning a power level to the physical channel.

It should be understood, the signature may be associated to any substep in the processing, without limitation. The signature may include at least one of: an encoding parameter, a modulating parameter, a spreading parameter, a resource mapping parameter, a power allocation parameter, a resource mapping pattern, and an orthogonal cover code. The spreading parameter may include a spreading sequence. Further, the signature may be not a specific parameter, it may just indicates a type of processing manner or a function.

In embodiments of the present disclosure, the DMRS configuration includes at least one of: an identifier number n of a DMRS port, an identifier number $ID_{GP}$ of a generation parameter of a DMRS sequence, and a value of the generation parameter of the DMRS sequence.

For an example, the DMRS port ID identifies the $i^{th}$ antenna ports $\tilde{p}_i$ identified in section 6.4.1.1.3 of 3GPP TS 38.211. In some embodiments, the DMRS port ID can be provided by an antenna port field in downlink control channel information, such as DCI format 0_1, using one or more tables identifying the DMRS port from the antenna port field, such as Tables 7.3.1.1.2-6 through 7.3.1.1.2-23 of 3GPP TS 38.212 revision 15.2.0. Alternatively, the DMRS port ID can be configured to the UE in RRC signalling, as described in section 6.1.2.3 of 3GPP TS 38.214 revision 15.2.0.

In embodiments of the present disclosure, an identifier number $ID_S$ of the signature is determined based on at least one of: the identifier number n of the DMRS port, the $ID_{GP}$, and the value of the generation parameter. With these identifier numbers, the relationship between signatures, DMRS ports, and the generation parameters (indicating different DMRS sequences) may be established clearly.

In embodiments of the present disclosure, the $ID_S$ is determined by: $ID_S=n*M+ID_{GP}$, wherein n is an integer in a range of [0, N−1], $ID_{GP}$ is an integer in a range of [0, M−1], N is a number of DMRS ports, and M is a number of DMRS sequences. With this formula, it should be calculated that N DMRS port and M DMRS sequences will serve N*M signatures (i.e. physical channels).

In embodiments of the present disclosure, the generation parameter includes at least one of: a scramblingID, a cyclic shift, and a root sequence, which are used for generating the DMRS sequence.

In embodiments of the present disclosure, the $ID_S$ is determined by: $ID_S=P1*mod(ID_{GP}, P2)+n$, wherein P1 is a number of DMRS ports, and P2 is a number of DMRS sequences. Without limitation, any formulas may be used for determining the $ID_S$.

In embodiments of the present disclosure, as a specific embodiment, step S202 may include: sending, to the terminal device, a message including at least one of the n, the $ID_{GP}$, and the value of the generation parameter. Then, the $ID_S$ is determined by the terminal device, based on the at least one of the n, the $ID_{GP}$, and the value of the generation parameter of the DMRS sequence.

Alternatively, the network side node may directly send, to the terminal device, a message including the $ID_S$, and at least one of the n, the $ID_{GP}$, and the value of the generation parameter. The terminal device does not need to know the specific configuration manner, thus, the processing steps of the terminal device are reduced. Meanwhile, the system will be safer, since a terminal device does not know other terminal device's configuration.

Accordingly, the step S211, obtaining a DMRS configuration and a corresponding signature assigned by a network side node includes one of: receiving, from the network side node, a message including at least one of the n, the $ID_{GP}$, and the value of the generation parameter; wherein the $ID_S$ is determined by the terminal device, based on the at least one of the n, the $ID_{GP}$, and the value of the generation parameter of the DMRS sequence; and receiving, from the network side node, a message including the $ID_S$, and at least one of the n, the $ID_P$, and the value of the generation parameter.

Figure 3:
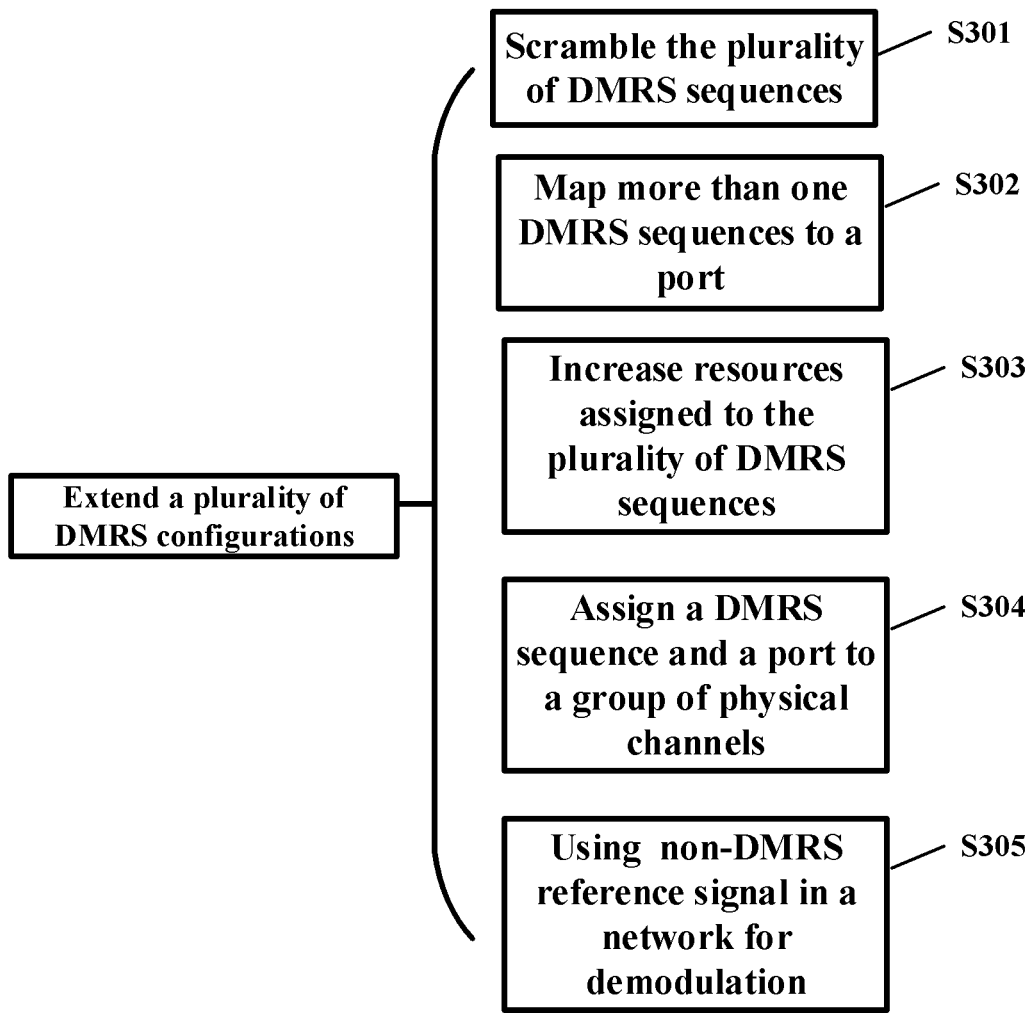
FIG. 3 is an exemplary diagram showing manners to extend DMRS configurations.

FIG. 3 is an exemplary diagram showing manners to extend DMRS configurations.

In embodiments of the present disclosure, the DMRS configuration is assigned from a plurality of DMRS configurations extended using at least one of: scrambling (S301) a plurality of DMRS sequences with a plurality of scrambling sequences; mapping (S302) more than one DMRS sequences to a DMRS port; increasing (S303) resources assigned to the plurality of DMRS sequences, wherein the resource includes at least one of time resource, frequency resource, and code division multiplexing (CDM) cover code resource; assigning (S304) a DMRS sequence and a DMRS port to a group of physical channels corresponding to terminal devices located in a predetermined physical distance; and using (S305) a non-DMRS reference signal in a network for demodulation as a function of DMRS.

Besides jointly configuring the signature and the DMRS configuration, the DMRS configurations themselves may also be extended, thus, more terminal device may be served, particularly in a NOMA system.

Another advantage of scrambling is that many sequences are applicable to be used as scrambling sequences.

In embodiments of the present disclosure, for step S301, the plurality of scrambling sequences includes at least one of a pseudorandom sequence, an M-sequence, and a Gold sequence; and/or the plurality of scrambling sequences are distinguished with each other by changing at least one of a root index, a generator polynomial, a cyclic shift value, and a sequence offset value. These sequences are easy to be generated with existing hardware or software. By simply changing a generation parameter, such as a root index, a generator polynomial, a cyclic shift value, and a sequence offset value, a group of scrambling sequences will be obtained. These sequences also have good autocorrelation property, and thus they are easy to be detected and descrambled.

A first group of DMRS sequences may be obtained according to any conventional procedure, such as described in section 6.4.1, 3GPP TS 38.211, version 15.2.0. Further, in step S301, sequences in the first group of DMRS sequences may be scrambled, to generate a second group of DMRS sequences. After scrambling, the second group of DMRS sequences has more available sequences than the first group of DMRS sequences. The number of nodes to be served in a communication system may be increased.

In such embodiment, the nodes to be severed are increased in a manner which is easy to be implemented in an existing communication network. As to the communication network, only a scrambling procedure is added at a transmitter side, and a descrambling procedure is added at a receiver side.

In embodiments of the present disclosure, the plurality of scrambling sequences are determined based on the signature. Therefore, more configurations are jointly determined.

In embodiments of the present disclosure, a scrambling sequence with $ID_{SQ}$ and a DMRS sequence with $ID_D$ are assigned to a physical channel associated to the signature with $ID_S$; wherein ID refers to an identifier number, $ID_S$ refers to an identifier number of the signature, $ID_{SQ}$ refers to an identifier number of the scrambling sequence, and $ID_D$ refers to an identifier number of DMRS sequence; wherein the $ID_{SQ}$ equals to one of floor ($ID_S/X$) and mod ($ID_S$, X), and the $ID_D$ equals to other one of floor ($ID_S/X$) and mod ($ID_S$, X); and wherein X refers to one of: a number of the plurality of DMRS sequences and a number of the plurality of scrambling sequences.

Namely, in embodiments of the present disclosure, the plurality of scrambling sequences are signature specific. For a specific physical channel, a corresponding scrambling sequence is determined, with considering the signature of the physical channel. Since both the network node and the each terminal device are acknowledged with the information about the signature of corresponding physical channel to be used for a transmission, it is easy for the network node and the terminal device to determine/generate the scrambling sequence. No additional message or signaling is needed.

Further, with consideration of the parameter of the physical channel, the scrambling sequences are better arranged to reduce the cross correlation property between adjacent physical channels. For example, for the adjacent physical channels with adjacent frequency resource and/or time resource, scrambling sequences with less cross correlation are assigned.

For clear illustration but without limitation, $ID_S$ is used to identify different signature. The $ID_S$ may be an integer, such as 0, 1, 2 . . . . For example, $ID_S$ with value of 0 may refer to one modulation parameter corresponding to a physical channel, and $ID_S$ with value of 1 may refer to another modulation parameter corresponding to another physical channel.

For example, there may be 30 signatures with $ID_S$ from 0 to 29, and there may be 5(=X) DMRS sequences with $ID_D$ from 0 to 4, and 6 scrambling sequences with $ID_{SQ}$ from 0 to 5. For an $ID_S=11$, The $ID_{SQ}$ may equal to floor ($ID_S/N$)= floor (11/5)=2, and the $ID_D$ may equal to mod ($ID_S$, N)=mod (11, 5)=1.

In embodiments of the present disclosure, a scrambling sequence with the $ID_{SQ}$ of 0 is a sequence containing elements with the same value. Such scrambling sequence will do not change the property of the DMRS sequence. For example, 1, −1 or any other value may be used.

The original plurality of DMRS sequences may be orthogonal. When the number of the physical channels is no more than the original plurality of DMRS sequences, the DMRS sequences may be directly applied to the physical channels without scrambling. The scrambling sequence with the $ID_{SQ}$ of 0 (trivial sequence) may be selected for the corresponding terminal devices.

Such trivial sequence provides compatibility for different type of terminal devices, some of which maybe do not support scrambling/descrambling DMRS sequences.

In embodiments of the present disclosure, for bettering distinguishing different terminal devices, an information element for a terminal device is configured to indicate whether to support a scrambled DMRS sequence. This configuration will be applicable in a communication system including devices supporting or not a scrambled DMRS sequence. For those not supporting the scrambled DMRS sequence, original DMRS sequence will be retained.

In embodiments of the present disclosure, the terminal device includes a non orthogonal multiple access, NOMA, terminal configured to support the scrambled DMRS sequence. In a NOMA system, it may be convenient to assume the devices is already configured to support the scrambled DMRS sequence.

In embodiments of the present disclosure, the plurality of DMRS sequences are orthogonal, to improve distinguishing different physical channels.

For step S302, the number of DMRS sequences may be kept, while mapping manner between the DMRS sequences and ports may be improved.

As long as the more than one DMRS sequences are distinguishingly, preferably orthogonally, generated with different generation parameters, more than one physical channel may be supported in one port. Then the same more than one DMRS sequences may be mapped to more ports, thus, the DMRS sequences are extended for more terminal devices.

For generating sequences distinguishingly, the generation parameter comprise at least one of: a scramblingID, a cyclic shift, and a root sequence, etc., which are used for generating the DMRS sequences.

As described in section 6.4.1, 3GPP TS 38.211, version 15.2.0, different generation parameters are selectively used for generating the sequences according to the specific policy of the network.

Below is quotation from section 6.4.1.1.1.1 and section 6.4.1.1.1.2:

6.4.1.1.1.1 Sequence generation when transform precoding is disabled

If transform precoding for PUSCH is not enabled, the sequence r(n) shall be generated according to $$r(n) = \frac{1}{\sqrt{2}}(1 - 2 \cdot c(2n)) + j\frac{1}{\sqrt{2}}(1 - 2 \cdot c(2n+1)).$$

where the pseudo-random sequence c(i) is defined in clause 5.2.1. The pseudo-random sequence generator shall be initialized with $$c_{init} = (2^{17}(N_{symb}^{slot}n_{s,f}^{\mu}+l+1)(2N_{ID}^{nSCID}+1) + 2N_{ID}^{nSCID} + n_{SCID}) \bmod 2^{31}$$

where l is the OFDM symbol number within the slot, $n_{s,f}^{\mu}$ is the slot number within a frame, and $N_{ID}^{0}, N_{ID}^{1} \in \{0, 1, \ldots, 65535\}$ are given by the higher-layer parameters scramblingID0 and scramblingID1, respectively, in the DMRS-UplinkConfig IE if provided and the PUSCH is scheduled by DCI format 0_1;

$N_{ID}^{0} \in \{0, 1, \ldots, 65535\}$ is given by the higher-layer parameter scramblingID0 in the DMRS'-UplinkConfig IE if provided and the PUSCH is scheduled by DCI format 0_0 with the CRC scrambled by C-RNTI;

$N_{ID}^{nSCID} = N_{ID}^{cell}$ otherwise.

The quantity $n_{SCID} \in \{0,1\}$ is indicated by the DM-RS initialization field, if present, in the DCI associated with the PUSCH transmission if DCI format 0_1 in [4, TS 38.212] is used, otherwise $n_{SCID}=0$.

6.4.1.1.1.2 Sequence generation when transform precoding is enabled

If transform precoding for PUSCH is enabled, the reference-signal sequence r(n) shall be generated according to $$r(n)=r_{u,v}^{(\alpha,\delta)}(n)$$

$$n=0,1,\ldots,M_{sc}^{PUSCH}/2^{\delta}-1$$

where $r_{u,v}^{(\alpha,\delta)}(m)$ is given by clause 5.2.2 with $\delta=1$ and $\alpha=0$ for a PUSCH transmission dynamically scheduled by DCI.

The sequence group $u=(f_{gh}+n_{ID}^{RS}) \bmod 30$, where $n_{ID}^{RS}$ is given by $n_{ID}^{RS}=n_{ID}^{PUSCH}$ if $n_{ID}^{PUSCH}$ is configured by the higher-layer parameter nPUSCH-Identity in the DMRS-UplinkConfig IE and the PUSCH is not a msg3 PUSCH according to clause 8.3 in [5, TS 38.213].

$n_{ID}^{RS}=N_{ID}^{cell}$ otherwise where $f_{gh}$ and the sequence number v are given by:

if neither group, nor sequence hopping shall be used $f_{gh}=0$ $v=0$ if group hopping but not sequence hopping shall be used $$f_{gh} = \left(\sum_{m=0}^{7} 2^m c\left(8\left(N_{symb}^{slot}n_{s,f}^{\mu}+l\right)+m\right)\right) \bmod 30$$

$v = 0$ where the pseudo-random sequence c(i) is defined by clause 5.2.1 and shall be initialized with $c_{init}=\lfloor n_{ID}^{RS}/30 \rfloor$ at the beginning of each radio frame if sequence hopping but not group hopping shall be used $f_{gh} = 0$ $$v = \begin{cases} c\left(N_{symb}^{slot}n_{s,f}^{\mu}+l\right) & \text{if } M_{ZC} \geq 6N_{sc}^{RB} \\ 0 & \text{otherwise} \end{cases}$$

where the pseudo-random sequence c(i) is defined by clause 5.2.1 and shall be initialized with $c_{init}=n_{ID}^{RS}$ at the beginning of each radio frame The quantity l above is the OFDM symbol number except for the case of double-symbol DMRS in which case l is the OFDM symbol number of the first symbol of the double-symbol DMRS.

Firstly, considering the DMRS when transform precoding is not used, initializing c(i) with a different initialization value $c_{init}$ from that of another DMRS will cause two different DMRSs. The value $c_{init}$ depends on $N_{ID}^{0}$ and/or $N_{ID}^{1}$ and both of these parameters can be signaled to each UE independently with other UEs, they are named as scramblingID (scramblingID0 and scramblingID1) for the DMRS used by the UE.

Next, considering the DMRS when transform precoding is used, since the sequence $r_{u,v}^{(\alpha,\delta)}(m)$ is Zadoff-Chu ('ZC') sequence, it can be said to apply different cyclic shifts and root values of the root sequence to generate sequence r( ).

Considering same cyclic shift, furthermore, applying different groups, i.e. u values for two DMRSs corresponding to a given antenna port will generate 2 DMRS sequences. Since u depends on $f_{gh}$ and $n_{ID}^{RS}$ and both of these parameters can be signaled to each UE independently with other UEs, they can be said to be generation parameters for the DMRS used by the UE.

Considering different cyclic shift values v within same group u, v can be said as to be generation parameters for the DMRS used by UE.

So in general, the different configurations for u are said as to be generation parameters for the DMRS used by UE when transform precoding is used.

Figure 4:
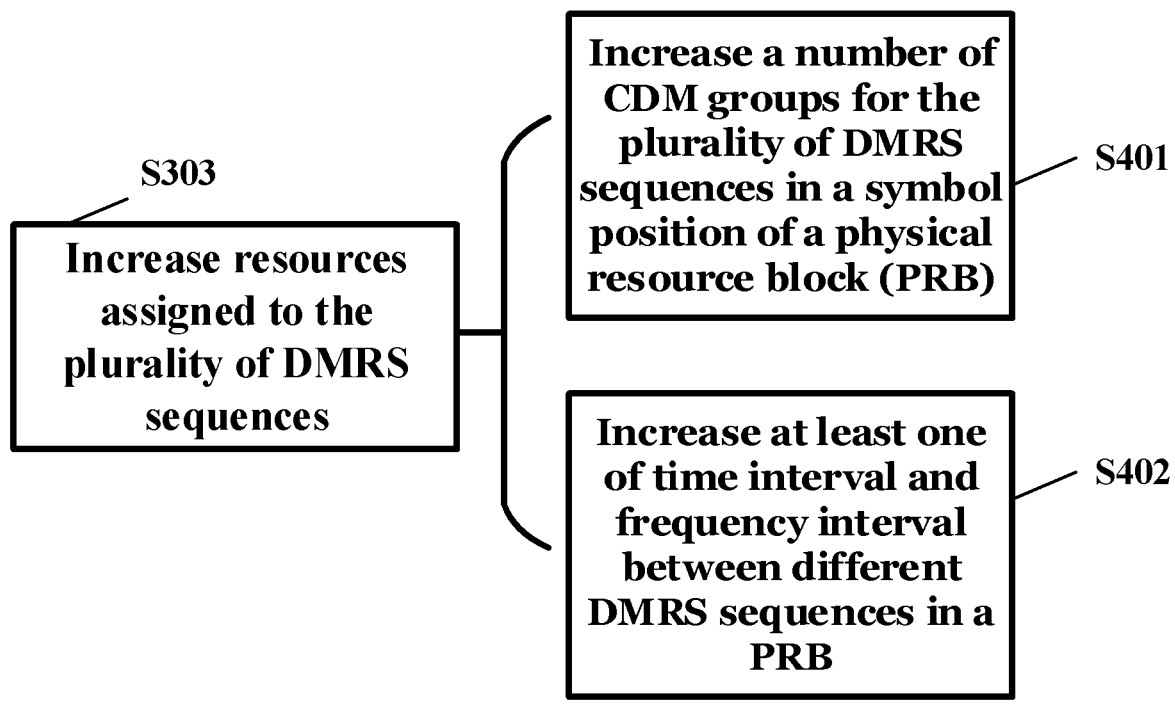
FIG. 4 is an exemplary flow chart showing substeps of the method shown in FIG. 3.

FIG. 4 is an exemplary flow chart showing substeps of the method shown in FIG. 3.

In embodiments of the present disclosure, increasing (S303) resources assigned to the plurality of DMRS sequences includes at least one of: increasing (S401) a number of CDM groups for the plurality of DMRS sequences in a symbol of a physical resource block (PRB); and increasing (S402) at least one of time interval and frequency interval between different DMRS sequences in a PRB.

The DMRS configuration may be further extended by varying the assigning manner of the physical resource.

Figure 5:
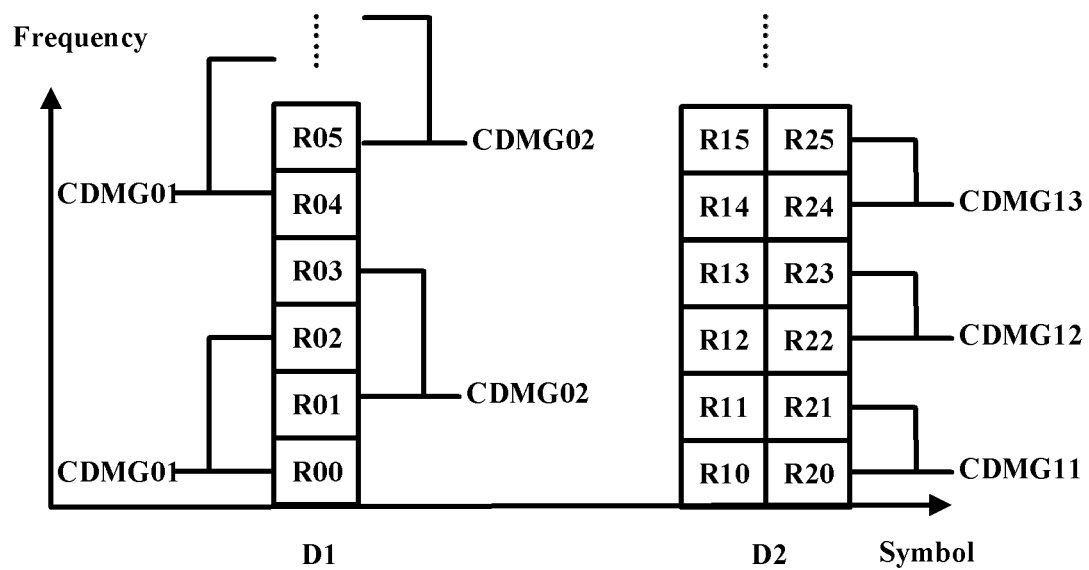
FIG. 5 is an exemplary mapping of DMRS with code division multiplexing (CDM)

FIG. 5 is an exemplary mapping of DMRS with code division multiplexing (CDM).

As shown in FIG. 5, two types of mapping are shown, type 1: comb based with 2 CDM (Code Division Multiplexing) groups; type 2: non-comb based with 3 CDM* groups.

As an example for the type 1, a single symbol based DMRS (D1) is shown, wherein a first code division multiplexing group (CDMG01) is allocated to resource element (R00, R02), (R04, R06), etc., and a second code division multiplexing group (CDMG02) is allocated to resource element (R01, R03), (R05, R07), etc.

As an example for the type 2, a double symbol based DMRS (D2) is shown, wherein a first code division multiplexing group (CDMG11) is allocated to resource element (R10, R20, R11, R21), etc., a second code division multiplexing group (CDMG12) is allocated to resource element (R12, R22, R13, R23), etc., and a third code division multiplexing group (CDMG13) is allocated to resource element (R14, R24, R15, R25), etc.

It should be understood that the single symbol based DMRS (D1) may also use the type 2 mapping, and the double symbol based DMRS (D2) may also use the type 1 mapping.

As an example, the number of CDM groups may be increased to more than 3. More CDM groups will increasing the physical channels to be served.

FIG. 6 is another exemplary mapping of DMRS with code division multiplexing (CDM).

As shown in FIG. 6, an example of double-symbol, type 1 DMRS multiplexing with both frequency division orthogonal cover code (FD-OCC) and time division orthogonal cover code (TD-OCC) is illustrated. Wherein r(i) is one sample of the DMRS sequence, and one PRB is illustrated on 2 OFDM symbols with DMRS. As can be seen 2 OCC code in frequency domain, 2 OCC code in time domain, and 2 CDM groups provide 8 DMRS ports.

In the FIG. 6, take Port 0 and Port 4 as an example for using the same resources and different TD-OCC. [1, 1] is assigned to Port 0, and it means the content in the first symbol is added with the content in the second symbol. With this operation, in the same resource, the content for the Port 0 is retained, while the content for the Port 4 is excluded. Conversely, [1, −1] is assigned to Port 4, and it means the content in the first symbol is subtracted by the content in the second symbol. With this operation, in the same resource, the content for the Port 0 is excluded, while the content for the Port 4 is retained.

With the same principle, a FD-OCC [1, 1] is assigned to Port 0, while a FD-OCC [1, −1] is assigned to Port 1.

With more resources, such as time, frequency, orthogonal cover code, CDM group, etc., it is obvious more ports will be provided to serve more physical channels.

It should be understood that, for better illustrating the available ports, the resource elements are not arranged as frequency-time axes. In FIG. 6, the subcarriers are also in parallel to the time line (symbol), and the ports are also arranged in parallel with each other to better show the relationships. However, the arrangement in the FIG. 6 can be directly changed to frequency-time axes without ambiguity. Further, the same element signs (r(0), r(1) . . . ) are used for every ports for clear illustration, however, the actual values of them may not necessarily be the same.

In embodiments for steps S304, and S305, the same reference signal configuration may be used to a group of physical channels.

Specifically, for the UEs, if the network can assume that a group of N UEs are close to each other, e.g. the physical (angular) distance between any of the 2 UEs are smaller than a predetermined or configured threshold (namely, the angles of arrival of transmissions from a group of N UEs are close to each other), one same DMRS port can be applied to this group of UEs.

For another example about the layers of UEs, different existing DMRS ports are used for different UEs and the same DMRS port is used for NOMA-style multiplexing of different data layers for same UE.

Further, the same reference signal includes other reference signal than DMRS. In embodiments of the present disclosure, extending the plurality of DMRS sequences may comprise: using another reference signal in a network for demodulation as a function of DMRS. The non-DMRS reference signal may a secondary synchronization signal (SSS).

As an example according to section 5.1.5 in 3GPP TS 38.214, version 15.2.0, one or 2 reference signals can be QCL-ed with the DMRS ports of PDSCH with different types, this will be also useful for DMRS design in downlink. Below is the quotation of the section 5.1.5:

5.1.5 Antenna ports quasi co-location

The UE can be configured with a list of up to M TCI-State configurations within the higher layer parameter PDSCH-Config to decode PDSCH according to a detected PDCCH with DCI intended for the UE and the given serving cell, where M depends on the UE capability. Each TCI-State contains parameters for configuring a quasi co-location relationship between one or two downlink reference signals and the DM-RS ports of the PDSCH. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS is given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The SSS signal can be used for channel estimation for a group of users for downlink, when the DMRS port for their PDSCH transmissions are supposed to be QCL-ed with SSS.

Due to embodiments in the present disclosure, with obtaining and extending the plurality of DMRS configuration, the number of nodes to be served in a communication system may be increased. Therefore, the DMRS sequences itself, or any other radio resources including time, frequency, CDM groups, and even other reference signal are utilized more thoroughly, and the number of terminal devices to be served may be increased obviously.

FIG. 7 is a block schematic showing an exemplary terminal device. As shown in FIG. 7, the terminal device 700 includes: a processor 701; and a memory 702, containing instructions executable by the processor. The terminal device 700 is operative to the method described in the first aspect, i.e., the method for the terminal device to determine DMRS, such as shown in FIG. 2.

Figure 8:
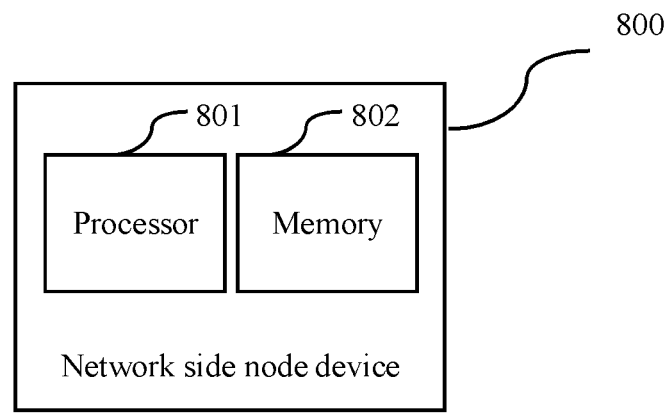
FIG. 8 is a block schematic showing an exemplary network side node device.

FIG. 8 is a block schematic showing an exemplary network side node device. As shown in FIG. 8, the network side node device 800 includes: a processor 801; and a memory 802, containing instructions executable by the processor. The network side node device 800 is operative to the method described in the second aspect, i.e., the method for a network side node to configure the DMRS.

Embodiments of the present disclosure further provide a virtual apparatus for a terminal device, including: obtainment unit, configure to obtain a DMRS configuration and a corresponding signature assigned by a network side node; construction unit, configured to constructing a DMRS according to the DMRS configuration and mapping unit, configured to map the DMRS to a physical channel assigned to the terminal device. The signature indicates a processing configuration for the physical channel.

Embodiments of the present disclosure further provide a virtual apparatus for a network side node device, including: determination unit, configured to determine a DMRS configuration from a plurality of DMRS configurations; and assignment unit, configured to assign the DMRS configuration and a corresponding signature to a terminal device, so as to serve a physical channel assigned to the terminal device. The signature indicates a processing configuration for the physical channel.

With virtual apparatus, the terminal device and the network side node device may not need fixed processor or memory, any computing resource and storage resource may be arranged from at least one node device in the network. The introduction of virtualization technology and network computing technology may improve the usage efficiency of the network resources and the flexibility of the network.

Figure 9:
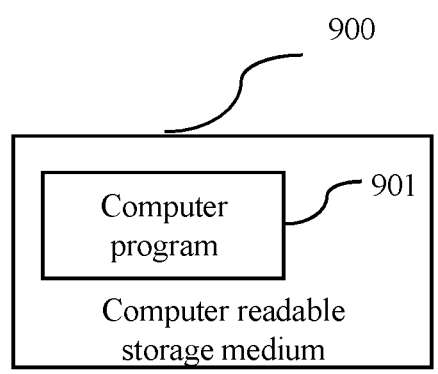
FIG. 9 is schematic showing computer readable storage medium in accordance with some embodiments.

FIG. 9 is schematic showing computer readable storage medium in accordance with some embodiments. As shown in FIG. 9, the computer readable storage medium 900 having a computer program 901 stored thereon, the computer program executable by a device to cause the device to carry out the method for a network side node device to configure DMRS, or the method for a terminal device to determine DMRS.

Figure 10:
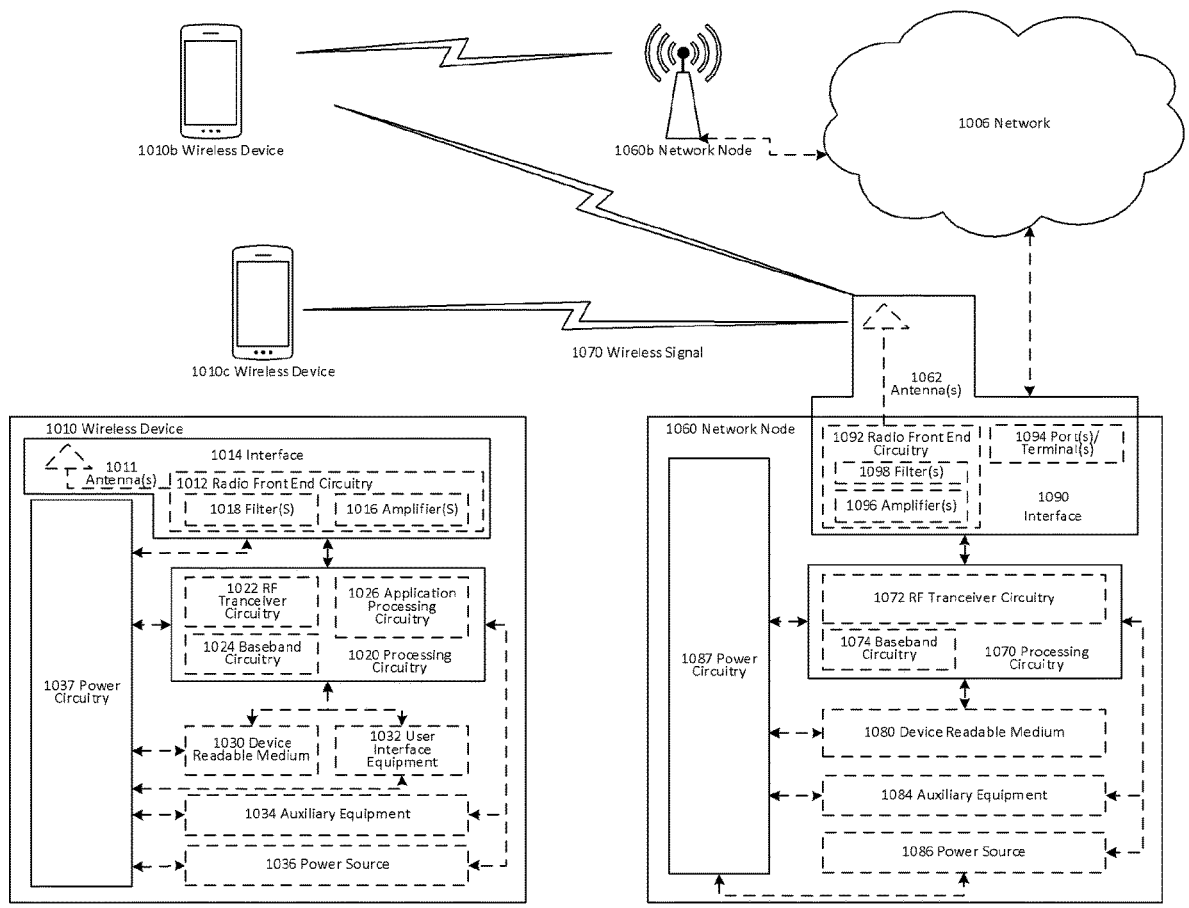
FIG. 10 is a schematic showing a wireless network in accordance with some embodiments.

FIG. 10 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060*b*, and WDs 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
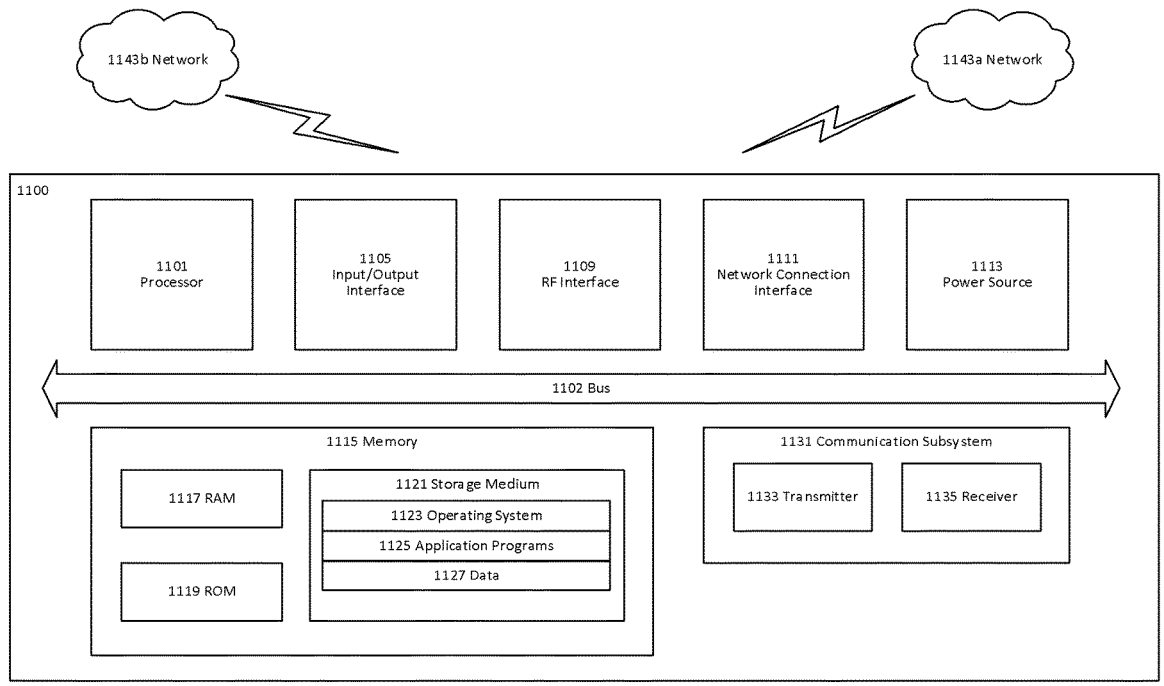
FIG. 11 is a schematic showing a user equipment in accordance with some embodiments.

FIG. 11 is a schematic showing a user equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
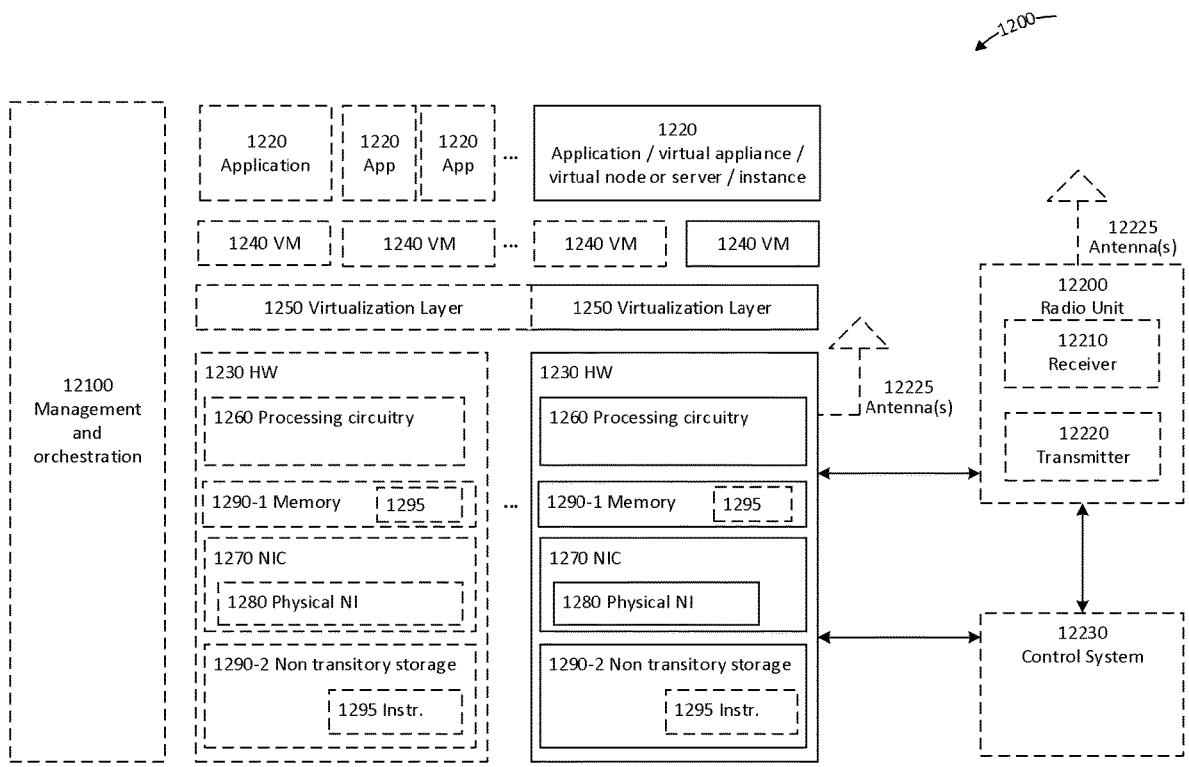
FIG. 12 is a schematic showing a virtualization environment in accordance with some embodiments.

FIG. 12 is a schematic showing a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
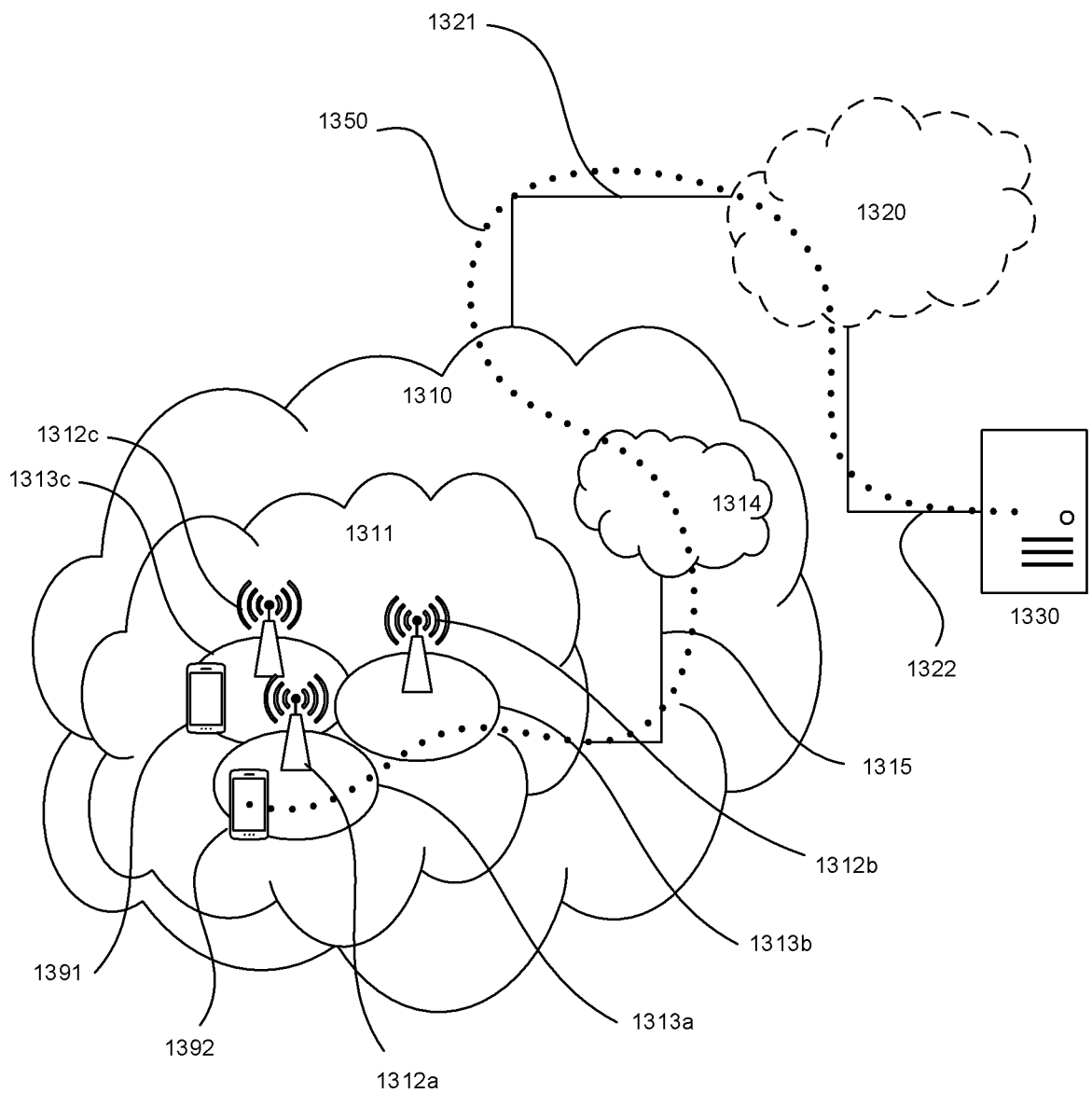
FIG. 13 is a schematic showing a telecommunication network connected via an intermediate network to a host computer in accordance with some embodiments.

FIG. 13 is a schematic showing a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
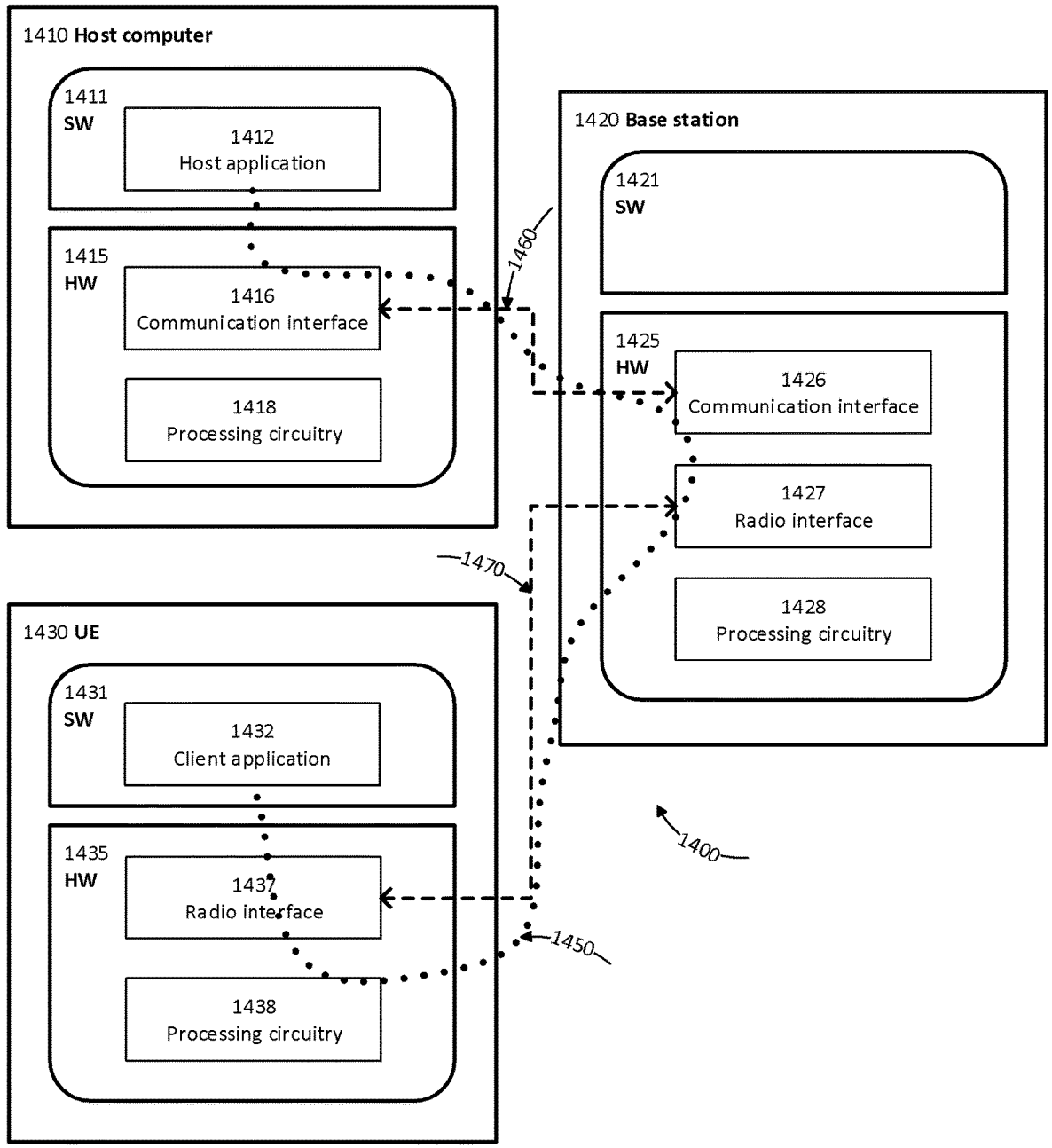
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
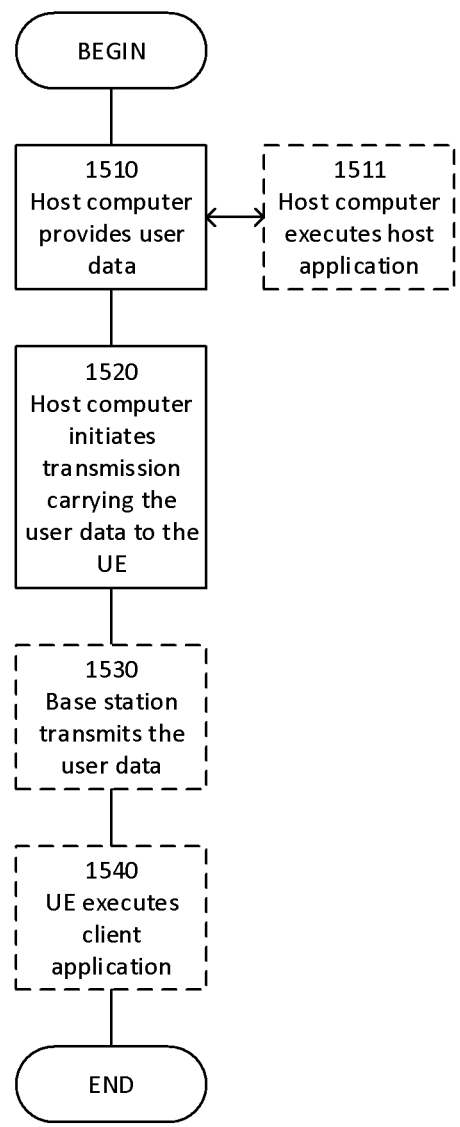
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
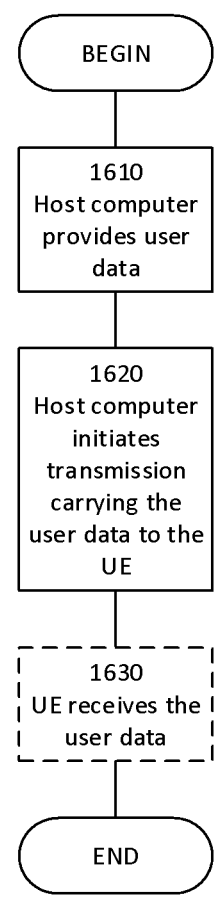
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the LIE receives the user data carried in the transmission.

Figure 17:
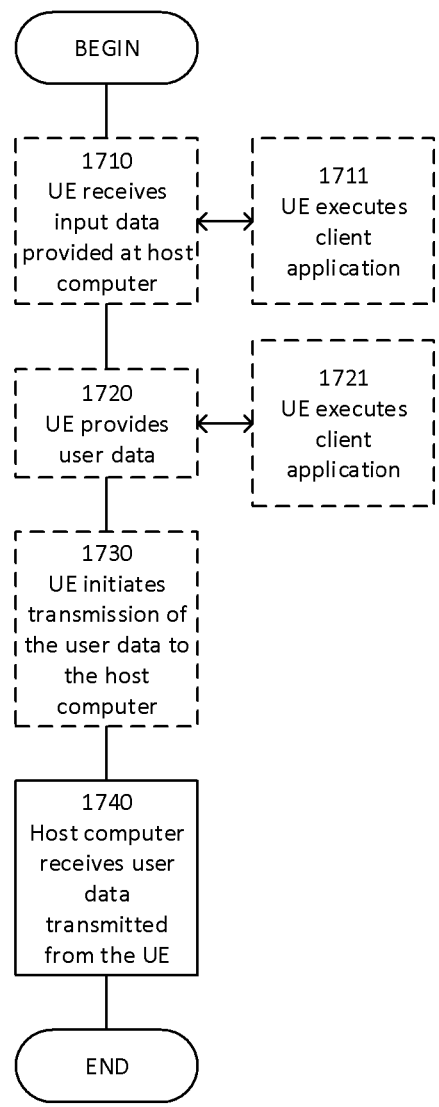
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
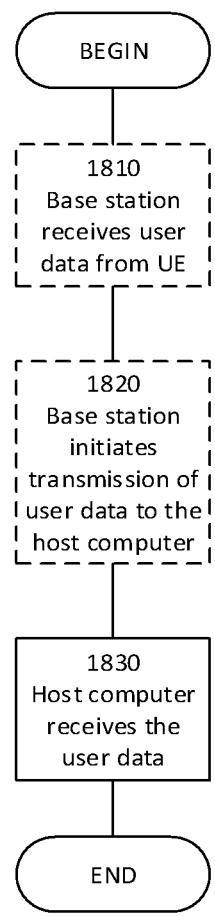
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Due to embodiments in the present disclosure, the signature, and DMRS configuration may be configured correspondingly, to obtain low-crosstalk DMRS signals for different terminal devices, thus, the number of the supported terminal devices may be improved. The method is particularly applicable to a non-orthogonal multiple access (NOMA) communication system with more nodes, when the number of conventional DMRS ports is not enough. Further, with obtaining and extending the plurality of DMRS configuration, the number of nodes to be served in a communication system may be increased. Therefore, the DMRS sequences itself, or any other radio resources including time, frequency, CDM groups, and even other reference signal are utilized more thoroughly, and the number of terminal devices to be served may be increased obviously.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method for a terminal device to determine demodulation reference signal (DMRS), the method comprising:
   obtaining a DMRS configuration and a corresponding signature assigned by a network side node;
   constructing a DMRS according to the DMRS configuration; and
   mapping the DMRS to a physical channel assigned to the terminal device;
   wherein the signature indicates a processing configuration for the physical channel, and wherein an identifier number $ID_S$ of the signature is determined based on at least one of: an identifier number n of a DMRS port, an identifier number $ID_{GP}$ of a generation parameter of a DMRS sequence, and a value of the generation parameter.

2. The method of claim 1,
   wherein the physical channel is assigned from a plurality of physical channels located at a set of radio resource elements; and/or
   wherein the processing configuration is for processing a transport block (TB) of the physical channel.

3. The method of claim 2, wherein processing a transport block (TB) comprises processing information bits of the transport block to produce modulation symbols carried in the physical channel, wherein the modulation symbols vary in response to that a different signature is applied to the same information bits, and wherein processing information bits of the transport block comprises at least one of:
   generating error correction coded bits of the information bits;
   interleaving the error correction coded bits;
   scrambling the error correction coded bits;
   mapping the error correction coded bits to the physical channel;
   generating modulation symbols of the information bits;
   spreading the modulation symbols;
   scrambling the modulation symbols; and
   assigning a power level to the physical channel.

4. The method of claim 1, wherein the DMRS configuration comprises at least one of: the identifier number n of the DMRS port, the identifier number $ID_{GP}$, and the value of the generation parameter.

5. The method of claim 1, wherein the $ID_S$ is determined by: $ID_S = n*M + ID_{GP}$, wherein n is an integer in a range of $[0, N-1]$, $ID_{GP}$ is an integer in a range of $[0, M-1]$, N is a number of DMRS ports, and M is a number of DMRS sequences.

6. The method of claim 1, wherein the generation parameter comprises at least one of: a scramblingID, a cyclic shift, and a root sequence, which are used for generating the DMRS sequence.

7. The method of claim 6, wherein the $ID_S$ is determined by: $ID_S = P1*\text{mod}(ID_{GP}, P2) + n$, wherein P1 is a number of DMRS ports, and P2 is a number of DMRS sequences.

8. The method of claim 1, wherein obtaining a DMRS configuration and a corresponding signature assigned by a network side node comprises one of:
   receiving, from the network side node, a message including at least one of the n, the $ID_{GP}$, and the value of the generation parameter; wherein the $ID_S$ is determined by the terminal device, based on the at least one of the n, the $ID_{GP}$, and the value of the generation parameter of the DMRS sequence; and
   receiving, from the network side node, a message including the $ID_S$, and at least one of the n, the $ID_{GP}$, and the value of the generation parameter.

9. The method of claim 1, wherein the DMRS configuration is assigned from a plurality of DMRS configurations extended using at least one of:
   scrambling a plurality of DMRS sequences with a plurality of scrambling sequences;
   mapping more than one DMRS sequences to a DMRS port;
   increasing resources assigned to the plurality of DMRS sequences, wherein the resource comprises at least one of time resource, frequency resource, and code division multiplexing (CDM) cover code resource;
   assigning a DMRS sequence and a DMRS port to a group of physical channels corresponding to terminal devices located in a predetermined physical distance; and
   using a non-DMRS reference signal in a network for demodulation as a function of DMRS.

10. The method of claim 9,
    wherein the plurality of scrambling sequences comprises at least one of a pseudorandom sequence, an M-sequence, and a Gold sequence; and/or
    wherein the plurality of scrambling sequences are distinguished from each other by changing at least one of a root index, a generator polynomial, a cyclic shift value, and a sequence offset value.

11. The method of claim 9,
    wherein the plurality of scrambling sequences are determined based on the signature.

12. The method of claim 11,
    wherein a scrambling sequence with $ID_{SQ}$ and a DMRS sequence with $ID_D$ are assigned to a physical channel associated to the signature with $ID_S$;
    wherein ID refers to an identifier number, $ID_S$ refers to an identifier number of the signature, $ID_{SQ}$ refers to an identifier number of the scrambling sequence, and $ID_D$ refers to an identifier number of DMRS sequence;
    wherein the $ID_{SQ}$ equals to one of floor $(ID_S/X)$ and mod $(ID_S, X)$, and the $ID_D$ equals to other one of floor $(ID_S/X)$ and mod $(ID_S, X)$; and
    wherein X refers to one of: a number of the plurality of DMRS sequences and a number of the plurality of scrambling sequences.

13. The method of claim 12, wherein a scrambling sequence with the $ID_{SQ}$ of 0 is a sequence containing elements with the same value.

14. The method of claim 9, wherein an information element for a terminal device is configured to indicate whether to support a scrambled DMRS sequence.

15. The method of claim 14, wherein the terminal device comprises a non-orthogonal multiple access (NOMA) terminal configured to support the scrambled DMRS sequence.

16. The method of claim 9, wherein the plurality of DMRS sequences are orthogonal.

17. The method of claim 9, wherein increasing resources assigned to the plurality of DMRS sequences comprises at least one of:
increasing a number of CDM groups for the plurality of DMRS sequences in a symbol of a physical resource block (PRB); and
increasing at least one of time interval and frequency interval between different DMRS sequences in a PRB.

18. The method of claim 9, wherein the non-DMRS reference signal is a secondary synchronization signal (SSS).

19. A terminal device, comprising:
a processor; and
a memory, containing instructions executable by the processor, whereby the terminal device is configured at least to:
obtain a demodulation reference signal (DMRS) configuration and a corresponding signature assigned by a network side node;
construct a DMRS according to the DMRS configuration; and
map the DMRS to a physical channel assigned to the terminal device;
wherein the signature indicates a processing configuration for the physical channel, and wherein an identifier number $ID_S$ of the signature is determined based on at least one of: an identifier number n of a DMRS port, an identifier number $ID_{GP}$ of a generation parameter of a DMRS sequence, and a value of the generation parameter.

* * * * *